(12) United States Patent
Yang et al.

(10) Patent No.: US 8,372,230 B2
(45) Date of Patent: Feb. 12, 2013

(54) ADHESIVES WITH MECHANICAL TUNABLE ADHESION

(75) Inventors: Shu Yang, Philadelphia, PA (US); Pei-chun Lin, Philadelphia, PA (US)

(73) Assignee: The Trustees Of The University Of Pennsylvania, Philadelphia, PA (US)

(*) Notice: Subject to any disclaimer, the term of this patent is extended or adjusted under 35 U.S.C. 154(b) by 495 days.

(21) Appl. No.: 12/593,756

(22) PCT Filed: Mar. 28, 2008

(86) PCT No.: PCT/US2008/058601

§ 371 (c)(1), (2), (4) Date: Jan. 12, 2010

(87) PCT Pub. No.: WO2008/121784

PCT Pub. Date: Oct. 9, 2008

(65) Prior Publication Data

US 2010/0116430 A1 May 13, 2010

Related U.S. Application Data

(60) Provisional application No. 60/909,090, filed on Mar. 30, 2007.

(51) Int. Cl.
*B32B 37/00* (2006.01)

(52) U.S. Cl. ...... 156/163; 156/164; 156/229; 156/272.2

(58) Field of Classification Search .................... 156/60, 156/163, 164, 229

See application file for complete search history.

(56) References Cited

U.S. PATENT DOCUMENTS

| | | | | |
|---|---|---|---|---|
| 5,650,215 | A * | 7/1997 | Mazurek et al. | 428/156 |
| 5,840,412 | A | 11/1998 | Wood et al. | |
| 6,197,397 | B1 * | 3/2001 | Sher et al. | 428/42.3 |
| 6,436,218 | B2 * | 8/2002 | Sher et al. | 156/209 |
| 6,770,323 | B2 * | 8/2004 | Genzer et al. | 427/248.1 |
| 6,839,217 | B1 * | 1/2005 | Larsen | 361/234 |
| 7,504,038 | B2 | 3/2009 | Bietsch et al. | |
| 2003/0160303 | A1 | 8/2003 | Hirokawa et al. | |
| 2005/0049566 | A1 | 3/2005 | Vukos et al. | |
| 2005/0059140 | A1 * | 3/2005 | Liebmann-Vinson et al. | 435/289.1 |
| 2005/0191582 | A1 | 9/2005 | Bietsch et al. | |
| 2006/0118514 | A1 | 6/2006 | Little et al. | |

FOREIGN PATENT DOCUMENTS

WO WO 2008/121784 10/2008

OTHER PUBLICATIONS

Efimenko, et al "Nested self-similar wrinkling patterns in skins", Nature naterials, vol. 4, Apr. 2005, pp. 293-297.*

Allen, "Analysis and Design of Structural Sandwich Panels", First Edition ed. Pergamon Press, (this is a book—no month available) 1969, Chapter 8, 156-189.

Bodo et al., "Titanium Deposition Onto Ion-Bombarded and Plasma-Treated Polydimethyllsiloxane: Surface Modification, Interface and Adhesion", Thin Solid Films, Feb. 1, 1986, 136(1), 147-159.

Bowden et al., "Self-Assembly of Mesoscale Objects into Ordered Two-Dimensional Arrays", Science, Apr. 11, 1997, 276(5310), 233-235.

(Continued)

*Primary Examiner* — Jeff Aftergut
(74) *Attorney, Agent, or Firm* — Woodcock Washburn, LLP

(57) ABSTRACT

The invention concerns a method for making an article having a tunable adhesive, said method comprising applying strain to mechanically deform a substrate in at least one direction; applying a rigid coating layer on the substrate; and releasing the strain to form an article having a rippled surface. Ripple characteristics can be altered by mechanical strain in real time which further changes the adhesion properties.

31 Claims, 10 Drawing Sheets

OTHER PUBLICATIONS

Bowden et al., "Spontaneous Formation of Ordered Structures in Thin Films of Metals Supported on an Elastomeric Polymer", Nature, May 14, 1998, 393, 146-149.
Bowden et al., "The Controlled Formation of Ordered, Sinussoidal Structures by Plasma Oxidation of an Elastomeric Polymer", Appl. Phys. Lett., Oct. 25, 1999, 75(17), 2557-2559.
Chan et al., "Fabricating Microlens Arrays by Surface Wrinkling", Adv. Mater. Dec. 2006, 18(24), 3238-3242.
Cerda et al., "Geometry and Physics of Wrinkling", Phys. Rev. Lett., Feb. 19, 2003, 90(7), 074302-074305.
Cerda et al., "Thin Films. Wrinkling of an Elastic Sheet Under Tension", Nature, Oct. 10, 2002, 419(6907), 579-580.
Chan et al., "Spontaneous Formation of Stable Aligned Wrinkling Patterns", Soft Matter, Mar. 6, 2006, 2(4), 324-328.
Chen et al., "Herringbone Buckling Patterns of Compressed Thin Films on Compliant Substrates", J. Appl. Mech. Trans. ASME, Sep. 2004, 71, 597-603.
Chen et al., "A Family of Herringbone Patterns in Thin Films", Scripta Mater., Nov. 2004, 50, 797-801.
Chua et al., "Spontaneous Formation of Complex and Ordered Structures on Oxygen-Plasma-Treated Elastomeric Polydimethylsiloxane", Appl. Phys. Lett., 2000, 76(6), 721-723.
Efimenko et al., "Nested Self-Similar Wrinkling Patterns in Skins", Nature Mater., Apr. 2005, 4(4), 293-297.
Genzer et al., "Soft Matter With Hard Skin: From Skin Wrinkles to Templating and Material Characterization", Soft Matter, Feb. 8, 2006, 2, 310-323.
Groenewold, "Wrinkling of Plates Coupled With Soft Elastic Media", Physica. A, Sep. 1, 2001, 298(1-2), 32-45.
Hamers, "Flexible Electronic Futures", Nature, Aug. 2, 2001, 412(6846), 489-490.
Hendricks et al., "Wrinkle-free nanomechanical film: control and prevention of polymer film buckling", NANO Letters, 2007, 7(2), 372-379.
Huang et al., "Kinetic Wrinkling of an Elastic Film on a Viscoelastic Substrate", J. Mech. Phys. Solids, Jan. 2005, 53(1), 63-89.
Huang et al., "Evolution of Wrinkles in Hard Films on Soft Substrates", Phys. Rev. E, Sep. 2004, 70(3 Pt 1), 030601-1-030601-4.
Huang et al., "Nonlinear Analysis of Wrinkles in a Film Bonded to a Compliant Substrate", J. of the Mechanics and Physics of Solids, Mar. 2005, 53, 2101-2118.
Huck et al., "Ordering of Spontaneously Formed Buckles on Planar Surfaces", Langmuir, Feb. 25, 2000, 16(7), 3497-3501.
Im et al., "Evolution of Wrinkles in Elastic-Viscoelastic Bilayer Thin Films", J. Appl. Mech. Trans. ASME, Nov. 2005, 72(6), 955-961.
Jiang et al., "Controlling Mammalian Cell Spreading and Cytoskeletal Arrangement with Conveniently Fabricated Continuous Wavy Features on Poly(dimethylsiloxane)", Langmuir, Mar. 2, 2002, 18(8), 3273-3280.
Katzenberg, "Topographic Processing of Silicone Surfaces", Surf. Coat. Tech., Oct. 2005, 200(1-4), 1097-1100.
Khang et al., "A Stretchable Form of Single-Crystal Silicon for High-Performance Electronics on Rubber Substrates", Science, Jan. 13, 2006, 311(5758), 208-212.
Kwon et al., "Theoretical analysis of two-dimensional buckling patterns of thin metal-polymer bilayer on the substrate", J. Appl. Phys., Sep. 15, 2005, 98(6), 063526-1-063526-7.
Lacour et al., "Stretchable Gold Conductors on Elastomeric Substrates", Appl. Phys. Lett., Apr. 14, 2003, 82(15), 2404-2406.
Lin et al., "Spontaneous formation of 1D ripples in transit to highly-ordered 2D herringbone structures through sequential and unequal 2D mechanical force", Advanced Phys. Letters, Jun. 12, 2007, 90(24), 241903-1-241903-3.
Mack et al., "Mechanically Flexible Thin-Film Transistors That Use Ultrathin Ribbons of Silicon Derived From Bulk Wafers", Appl. Phys. Lett., May 22, 2006, 88(21), 213101-1-213101-3.
Mahadevan et al., "Self-Organized Origami", Science, Mar. 18, 2005, 307(5716), 1740.
Morra et al., "On the aging of oxygen plasma-treated polydimethylsiloxane surfaces", Journal of Colloid and Interface Science, Jun. 1990, 137(1), 11-24.
Ohzono et al., "Geometry-Dependent Stripe Rearrangement Processes Induced by Strain on Preordered Microwrinkle Patterns", Langmuir, Aug. 2, 2005, 21(16), 7230-7237.
Ohzono et al., "Ordering of Microwrinkle Patterns by Compressive Strain", Phys. Rev. B, Apr. 15, 2004, 69(13), 132202-1-132202-4.
Ohzono et al., "Effect of Thermal Annealing and Compression on the Stability of Microwrinkle Patterns", Physical Review E, Aug. 2005, 72(2 Pt 2), 025203-1-025203-4.
Stafford et al., "A Buckling-Based Metrology for Measuring the Elastic Moduli of Polymeric Thin Films", Nature Mater., Aug. 3, 2004, 3(8), 545-550.
Sun et al., "Controlled Buckilng of Semiconductor Nanoribbons for Stretchable Electronics", Nature, Dec. 2006, 1, 201-207.
Terfort et al., "Three-Dimensional Self-Assembly of Millimetre-Scale Components", Nature, Mar. 13, 1997, 386, 162-164.
Yoo et al., "Physical Self-Assembly of Microstructures by Anisotropic Buckling", Adv. Mater., Oct. 2002, 14(19),1383-1387.
Yoo et al., "Microshaping Metal Surfaces by Wave-Directed Self-Organization", Appl. Phys. Lett., Oct. 6, 2003, 83(21), 4444-4446.

* cited by examiner

ADHESIVES WITH MECHANICAL TUNABLE ADHESION

CROSS-REFERENCE TO RELATED APPLICATIONS

This application is the National Stage of International Application No. PCT/US2008/058601, filed Mar. 28, 2008, which claims the benefit of U.S. Provisional Application No. 60/909,090, filed Mar. 30, 2007, the disclosures of which are incorporated herein by reference in their entirety.

FIELD OF THE INVENTION

The instant invention concerns adhesives with mechanical tunable adhesion and methods of producing and using same.

BACKGROUND OF THE INVENTION

Adhesives play important roles in our daily life, including office supplies (e.g. tapes, super glues, hot glues, etc), structure construction materials (e.g. epoxy, acrylics, silicone, etc), manufacturing and assembly of commercial products, and high-end devices. Although there are a diverse range of adhesive materials available commercially, each is designed for a specific application and most of them are for one-time usage. More importantly, once the adhesive material is fabricated, the adhesion properties are fixed.

The ability to actively induce features and textures on surfaces has been of great interest for many potential applications, including stretchable electronics, microlens arrays, MicroElectroMechanical Systems (MEMS), tunable surface adhesion and friction, and robotics. In the last decade various methodologies have been investigated to spontaneously form self organized structures with controlled morphologies ranging from macro-, to micro-, to nanoscale, as well as on the theoretical aspects. One widely adopted simple and effective approach is based on internal buckling force equilibrium within materials by coating a hard thin layer (through metal deposition or surface oxidization) on top of a pre-strained bulk substrate (i.e., heated), such as poly(dimethylsiloxane) (PDMS), followed by release of the pre-strain. During release, the self-organized wrinkles are formed simultaneously and permanently without further continuous input of external force or energy. No matter what wrinkle patterns that may be generated when altering localized internal force equilibrium within materials, the fundamental pattern lies in the same, that is either 1-dimensional (1D) ripple structure or 2-dimensional (2D) so-called herringbone structure.

Despite these advances, there is a need in the art to form various wrinkle patterns with a tunable adhesive force.

SUMMARY OF THE INVENTION

In some aspects, the invention involves methods for adjusting the adhesion of a rippled poly(dimethylsiloxane) (PDMS) film by changing the stretch applied to the film. Some rippled films are formed by oxidizing the surface of the film under a strain level of 20 to 60% and then releasing the strain.

Some methods provide a tunable adhesive by mechanically applying strain to a substrate in one or more different directions and in independently preselected magnitudes; applying a coating layer on the strained substrate, where the coating layer having a higher Young's Modulus than the substrate; and releasing at least a portion of the strain in at least one direction to provide the coating layer with predetermined rippled surface structure. In some embodiments, the strain is applied in two different directions and, in some cased, the two strains are applied in directions that are about perpendicular to each other.

In some embodiments, the invention concerns methods of forming an article comprising:

mechanically applying strain to a substrate a preselected direction and amount;

applying a coating layer on the strained substrate, said coating layer having a higher Young's Modulus than the substrate;

contacting the coating layer with a second substrate; and releasing said strain to provide the coating layer with predetermined rippled surface structure.

Some coatings are metal or silicone oxide. In certain embodiments, the substrate is poly(dimethylsiloxane). In these embodiments, the coating layer can be applied by oxidizing the surface of the poly(dimethylsiloxane). One method of oxidizing the surface is exposing the surface to ultraviolet light and oxygen (via oxygen plasma treatment, for example).

Stress can be applied to the substrate in one or more directions. In some embodiments, stress is applied in two directions. In certain embodiments, the two directions are offset by approximately 90 degrees. Stress can be applied simultaneously in the directions or sequentially. In one embodiment, the stress is sequentially applied in the two directions.

When stress is applied in one direction, the substrate has a one dimensional ripple structure after releasing the stress. When stress is applied in two directions, the substrate has a two dimensional ripple structure after releasing the stress.

Stress can be applied in various amounts. In some embodiments, the strain level is greater than about 1%. In other embodiments, the strain level is greater than about 10%. In yet other embodiments, the strain level is about 20 to about 60% or about 20 to about 40%. Strain is independently applied to the different directions and may vary in amount. In some embodiments, each of the directions are substantially equal.

Once the strain is applied, it can be release either sequentially or simultaneously. In some embodiments, the strain is released sequentially in the two directions. In other embodiments, the strain is released substantially simultaneously in the two directions.

In another embodiment, the invention concerns a method comprising:

mechanically applying strain to the a substrate in a preselected direction and amount;

applying a coating layer on the substrate, said coating layer having a higher Young's Modulus than the substrate;

coating the coating layer with a second coating layer;

contacting the second coating layer with a second substrate; and releasing said strain to provide the coating layer with predetermined rippled surface structure. In some embodiments, the second coating layer comprises an adhesive. Suitable adhesives include acrylates, methacrylates, or any adhesives of known of the art.

In some embodiments, the strain is released and then reapplied to the substrate in a predetermined amount and direction after applying the coating layer and prior to contacting with the second substrate. The second coating layer can be applied either prior to or after the strain is reapplied to the substrate. The level and direction of strain that is reapplied may be, independently, the same or different than the original strain applied to the substrate.

In some embodiments, the second substrate is plastic, ceramic, metal, or a release tape.

DETAILED DESCRIPTION OF ILLUSTRATIVE EMBODIMENTS

The ability to reversibly tune the adhesion of a material to another surface in a controlled fashion is highly desirable for many applications, including micro- and nanoelectronics, optoelectronics, biotechnology, and robotics. It has been found that adjusting the surface roughness on a wrinkled PDMS film by varying the stretch applied on the wrinkled film offers a wider range of tunability and robustness than other approaches to "pick, transfer, and release" individual components with different sizes and shapes in real-time. The approach has a set of advantages not offered by other techniques for regulation of adhesion, including real-time tunability, no requirement of specific surface chemistry, operability under ambient conditions, and relative ease of control.

Generally, adhesion force between two surfaces is determined by surface roughness and surface chemistry. Using mechanical-force-induced wrinkle formation, the present invention uses a novel method to spontaneously form 1D ripples and 2D (herringbone, for example) structures on polymer thin films. Such formed surface topography can be dynamically tuned through mechanical stretching (or straining) of the polymer films, resulting in reversibly tunable adhesion in a real-time. The use of mechanical force allows us to independently control the amount and timing of strain applied to the PDMS substrate on both planar directions (either simultaneously or sequentially). This added controllability, in contrast to the heat induced-strain method, appears critical to maneuver the pattern formation and transition.

In some embodiments, the invention concerns methods of forming an article comprising mechanically applying strain to a substrate a preselected direction and amount; applying a coating layer on the strained substrate, said coating layer having a higher Young's Modulus than the substrate; contacting the coating layer with a second substrate; and releasing said strain to provide the coating layer with predetermined rippled surface structure. Optionally, a second coating layer can be applied to the first coating layer. Optionally, the initial strain is released and then reapplied (same or different amount, same or different direction(s)) prior to contacting with the second substrate.

Strain ($\epsilon$) can be measured by the equation:

$$\epsilon=(L_1-L_0)/L_0$$

where $L_0$ is the original sample length and $L_1$ is the final sample length after stretch. To convert the S value to percent strain, $\epsilon$ is multiplied by 100. Thus, percent strain=$100\times(L_1-L_0)/L_0$.

The coating layers have a Young's modulus that is higher than that of the substrate. Young's Modulus (or tensile modulus) is a measure of the stiffness of a material. In particular, it is the ratio of the rate of stress change as a function of strain and can be determined from the slope of a stress-strain curve produced by tensile tests. Tensile properties of film, for example, can be determined by ASTM-D882.

Figure 1:
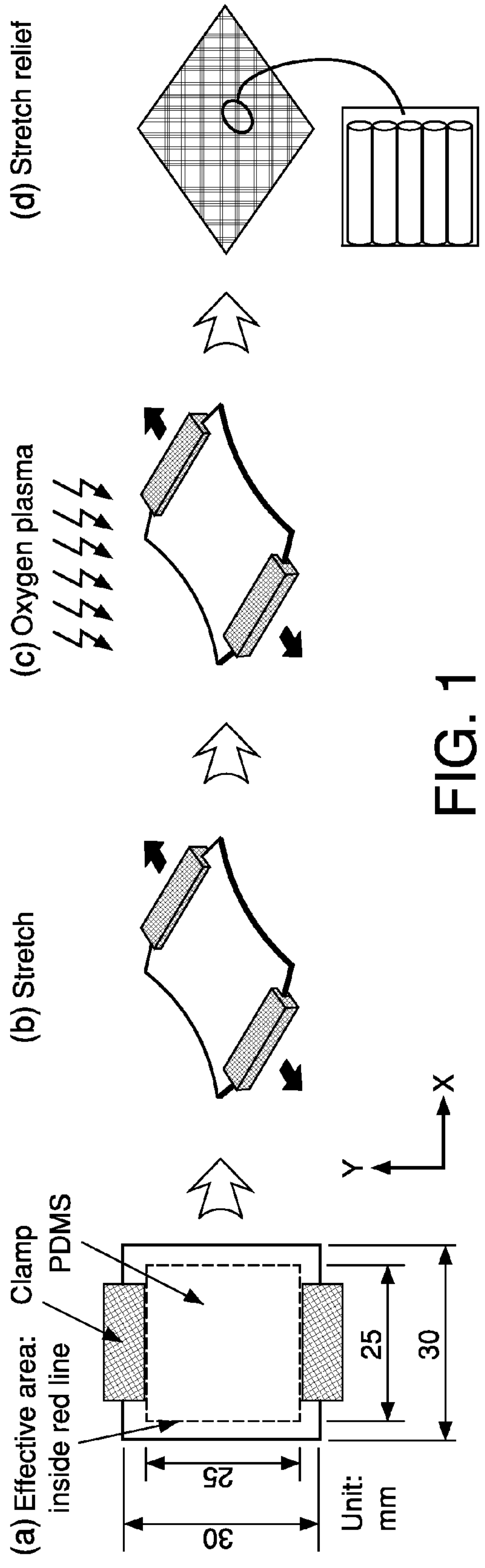
FIG. 1 shows a schematic illustration of the fabrication process to generate one dimensional wrinkle patterns (a-d).

An example of a simple and scalable fabrication process is shown in FIG. 1. First, a polymeric thin sheet (such as polydimethylsiloxane, PDMS) is mechanically stretched to a desired strain level (e.g. 20%), followed formation of a thin rigid layer on the stretched flexible sheet. The thin rigid layer can be formed by oxygen plasma treatment to generate a thin and hard glass-like SiOx layer on the film. During release of the strain, surface spontaneously 1D ripples (stretched in one direction) or 2D herringbone structures (stretched sequentially in two directions). In our demonstration we have made 30 mm×30 mm samples, however, the length of polymeric thin sheet is scalable at least to ~20 cm depended on the equipment for oxygen plasma process. Large film size is possible using an industrial facility.

Oxygen plasma treatment to produce silicone oxide surfaces is well known in the art. One technique, for example, is to place the substrate inside an oxygen plasma reactive ion etcher, such as a Technics PE11-A etcher, at 100 watts for 60 second, and pressure of 550 mtorr. Power, time and pressure can be varied depending on the needs of the application.

Metal coatings can be accomplished by a variety of techniques known to those skilled in the art. These techniques include electroplating, electroless plating, spraying, hot dipping, chemical vapor deposition and ion vapor deposition. The choice of technique used by one skilled in the art might depend on the substrate, the coating desired, and available facilities.

Figure 2:
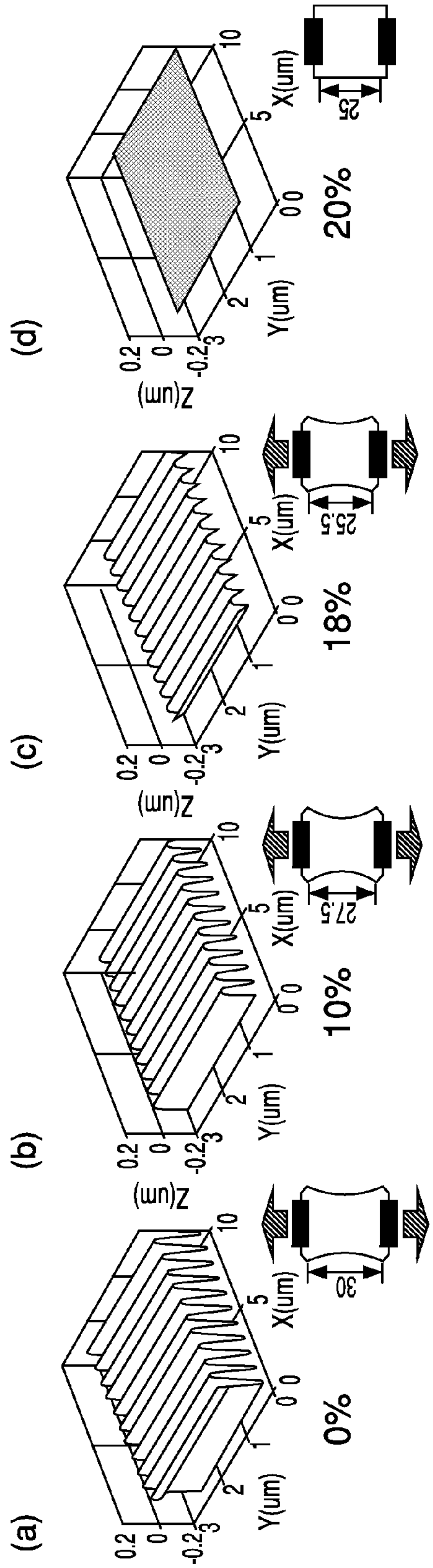
FIG. 2 illustrates to decrease in surface topography versus strain during mechanical stretching of PDMS film (a-d).
Figure 3:
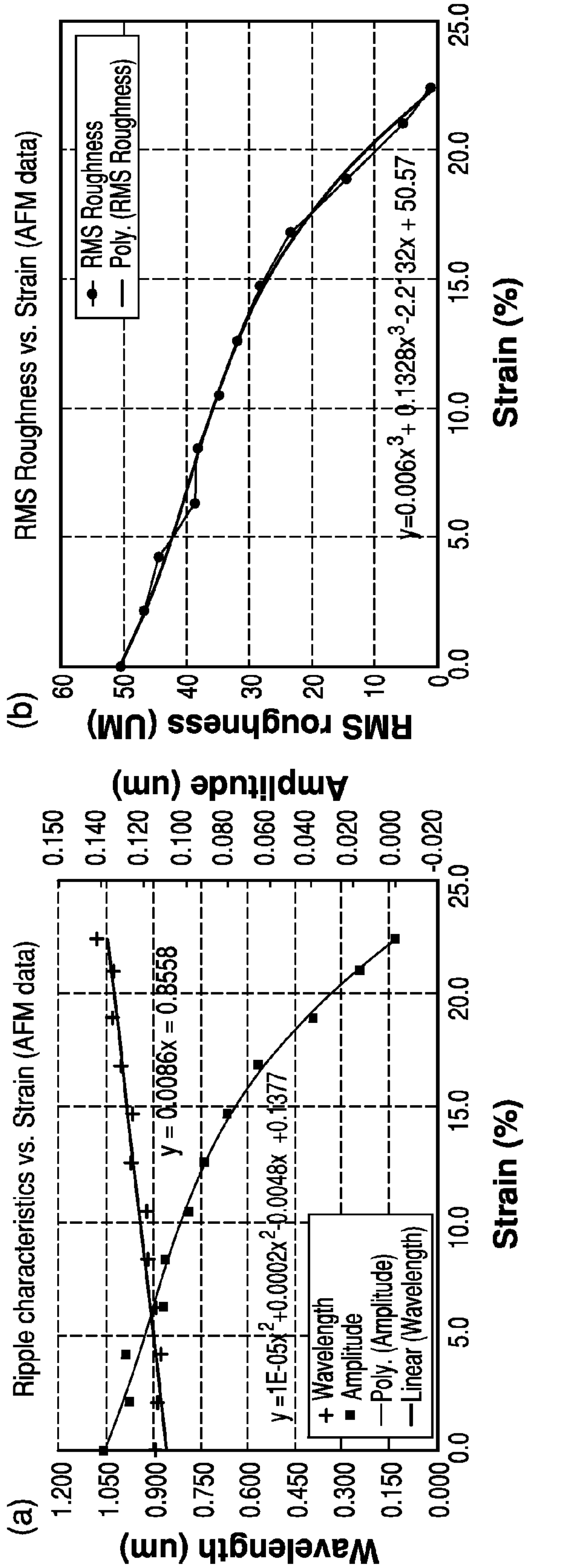
FIG. 3 illustrates (a) ripple characteristics versus strain and (b) surface roughness measured by AFM versus strain.

While not wanting to be bound by theory, the formation of the ripple pattern is a result of internal buckling force equilibrium within bi-layer materials composed by a hard thin layer (e.g. metal or oxide) deposited on a soft pre-strained (by heat- or mechanical force) bulk substrate. When no external force is applied on the thin sheet, the ripple-shape pattern remains stable as shown in FIG. 2*a*. When an external force is applied to the thin sheet, the surface topography gradually disappears with an increase of the wrinkle wavelength and a decrease of the amplitude (FIG. 2*b-c*) until reaching to the original pre-strain level and the surface becomes completely flattened (FIG. 2*d*). We confirm that this stretch/release process is reversible, which provides us control of ripple characteristics (wave length and amplitude), or surface roughness, by external mechanical force in real-time. This tunable and controllable surface topography further grants tunable adhesion force. FIG. 3*a* shows detailed relation between measured ripple characteristics and strain applied on the thin sheet, and FIG. 3*b* shows the Root Mean Square (RMS) roughness versus strain.

Figure 4:
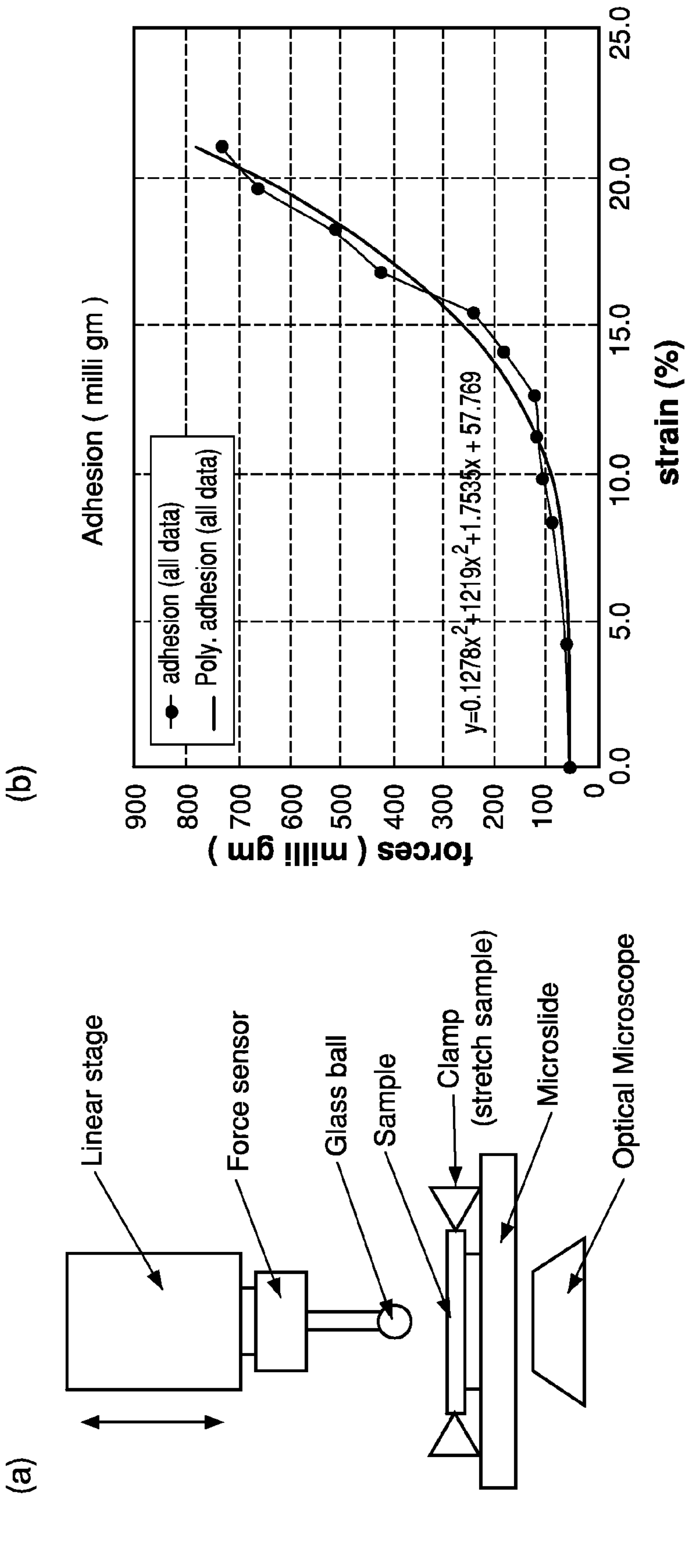
FIG. 4 presents (a) an illustrative sketch of an adhesion measurement setup and (b) a plot of adhesion force versus strain.

In order to test how surface roughness affects adhesion force, we conducted adhesion force measurement with different roughness setting shown in FIG. 4*a*. Computer controlled linear stage moves glass ball downward to indent the sample surface with designated speed and depth, and then withdraw the glass ball till it is separated from sample surface. Meanwhile, force data is collected simultaneously by a 10 g load cell connected between linear stage and glass ball, and the largest tension force between glass ball and sample surface represents the achievable adhesion force. The result of adhesion force vs. different strain setting is shown in FIG. 4*b*. From the plot, it is obvious that the adhesion force varies with different strain level, and the force difference can be as large as 10 times.

Figure 5:
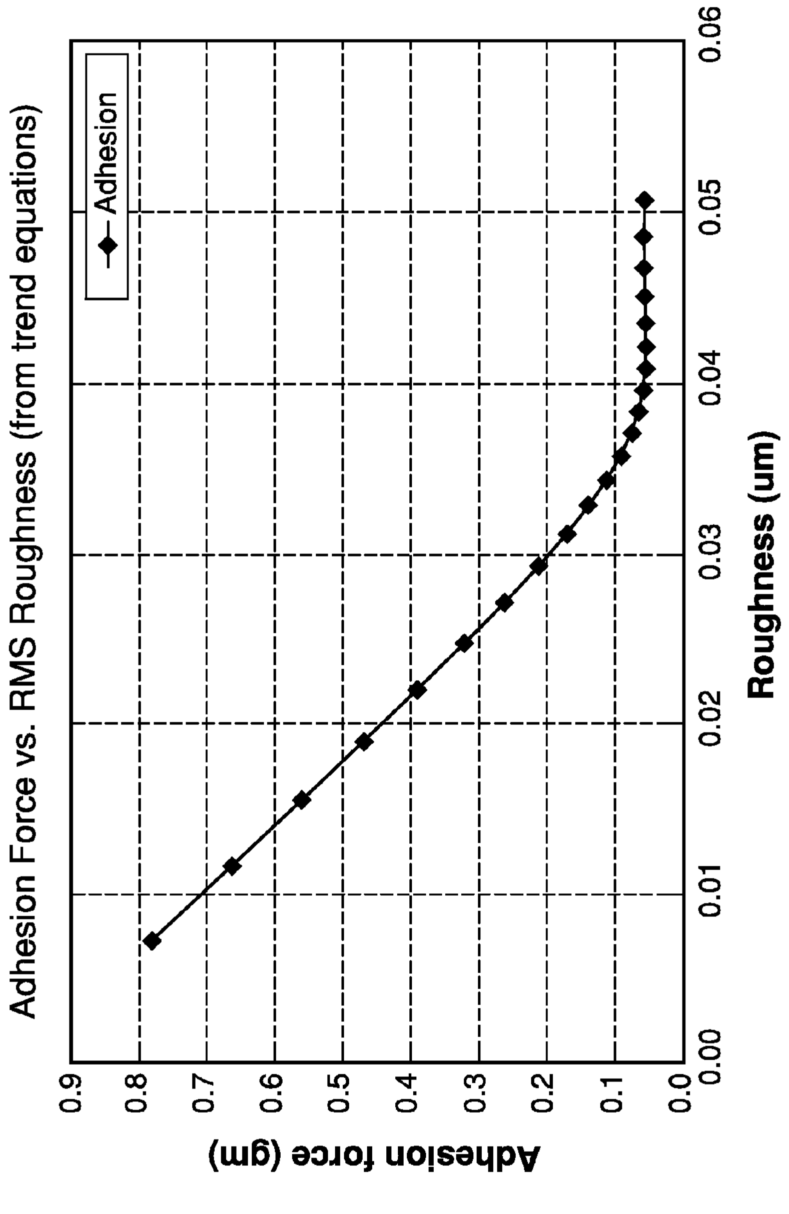
FIG. 5 shows a plot of adhesion force versus surface roughness.

As shown in FIG. 5, the adhesion force decrease linearly with the increase of roughness in the lower range of roughness, and remains the same after passing a certain threshold.

Without stretch, the prepared PDMS film with surface wrinkle patterns showed very little adhesion force that could hardly lift the glass ball. When the film was mechanically stretched, the PDMS film became flat, which was know to have very good wetting and adhesion properties, the glass ball was be easily lifted until the ball weight until the gravity exceeds the adhesive force between glass ball and PDMS film. When releasing the flat film, the surface roughness was regenerated, thus decreasing the adhesion force.

While most wrinkle structures are formed by heat-induced strain method, which expands the PDMS substrate equally and simultaneously by heat, here, our methods provide wrinkle formation induced by mechanical force in corporation with oxygen treatment of PDMS surface. The use of mechanical force allows us to independently control the amount and timing of strain applied to the PDMS substrate on both planar directions (either simultaneously or sequentially). This added controllability in contrast to heat-induced-strain method appears critical to maneuver the pattern formation and transition. We observed clear transitions from 1D ripples, to ripples with bifurcation, to ripple/herringbone mixed features, and to completely 2D herringbone structures when the strain ratio between two planar axis increases gradually from 0 (strain in one direction only) to 1 (strain in both directions with equal amount). Importantly, we demonstrate for the first time well-controlled, repeatable generation of a highly-ordered zigzag-based herringbone structure, which was predicted by the simulations.

The wavelength of the wrinkle patterns ranges from 500 nm to 2.5 μm depending on the pre-strain level and oxygen plasma time. We then systematically studied the width and height of the wrinkles, and their correlation between ripple and herringbone structures, to elucidate the mechanisms of pattern formation and transition under large strain levels (up to 60%). The mechanical-force-induced strain offers the opportunity to control the strains applied in three spatial directions separately, and provides a much wider achievable strain level in comparison to heat expansion (typically <10%). However, accurate control of the strain level over a sample by mechanical force is challenging. In order to minimize experimental errors and increase signal-to noise ratio, in some embodiments, we choose to work within large strain levels (20-60%). Therefore, to fabricate the bilayer structure, we use oxygen plasma to introduce a thin oxide layer on PDMS, thus, avoiding delamination of the hard layer from the soft bulk substrate under currently much wider strain range for all experiments.

In an exemplary experiment, a square-shaped PDMS strip (30 mm×30 mm) was clamped (FIG. 6*a*) and stretched (FIG. 6*b*) in both planar directions sequentially. The strain in the first direction (Y) was fixed at a specific value, 20%, and the strain in the second direction (X) was varied with a relative strain ratio ($\Delta X/\Delta Y$) ranging from 0 to 1 (FIGS. 6*e*-6*g*) until reaching equal strain as in the first direction. The stretched sample was then treated with oxygen plasma (FIG. 6*c*), followed by release in the reverse order (X first then Y) to prevent sample warping and generate wrinkle patterns uniformly (FIG. 6*d*). For comparison, another set of samples were stretched simultaneously in both planar directions with equal strain level.

Figure 6:
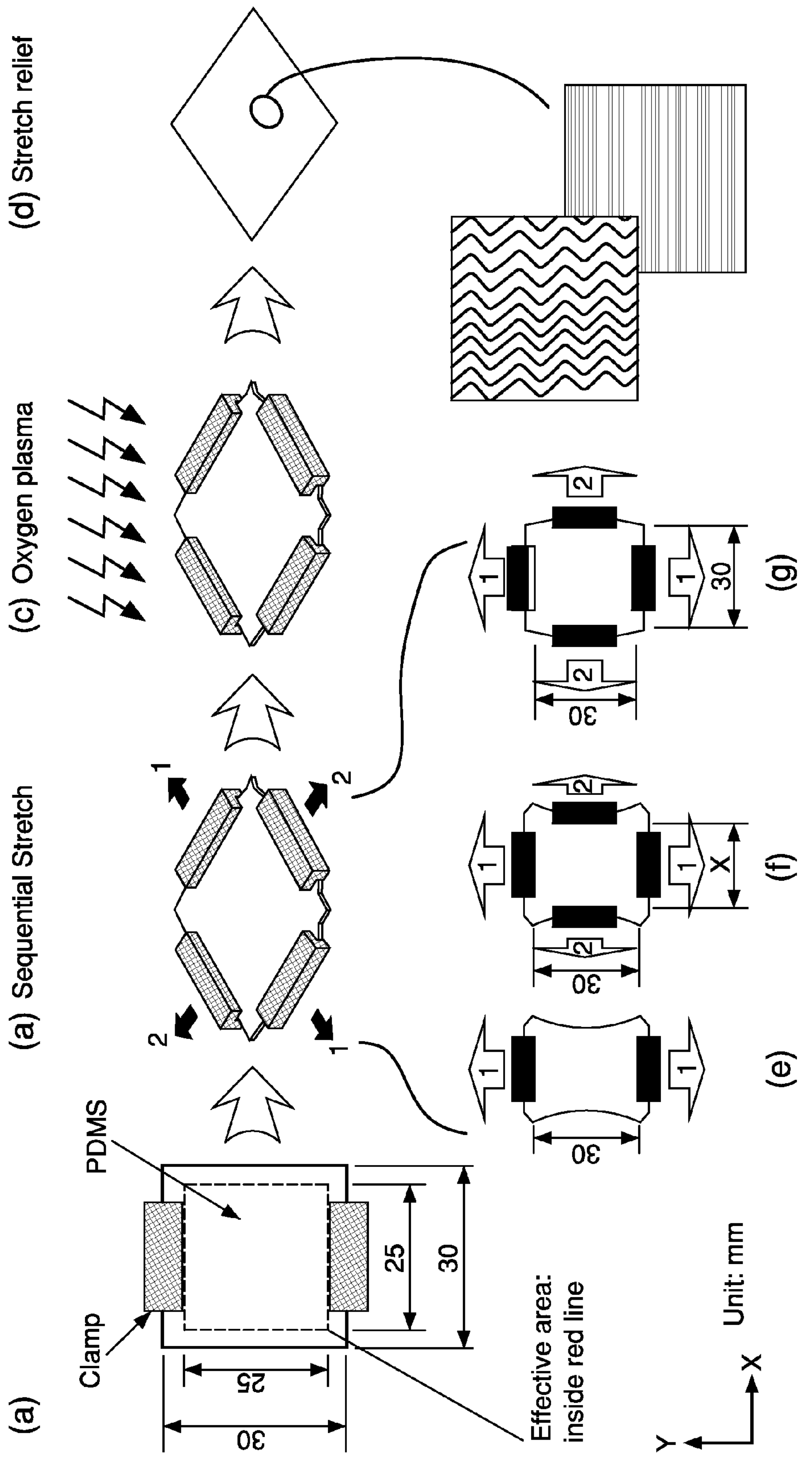
FIG. 6 presents a schematic of the fabrication process to generate wrinkle patters (a-d) and various stretch settings (e-g) used in (b).
Figure 7:
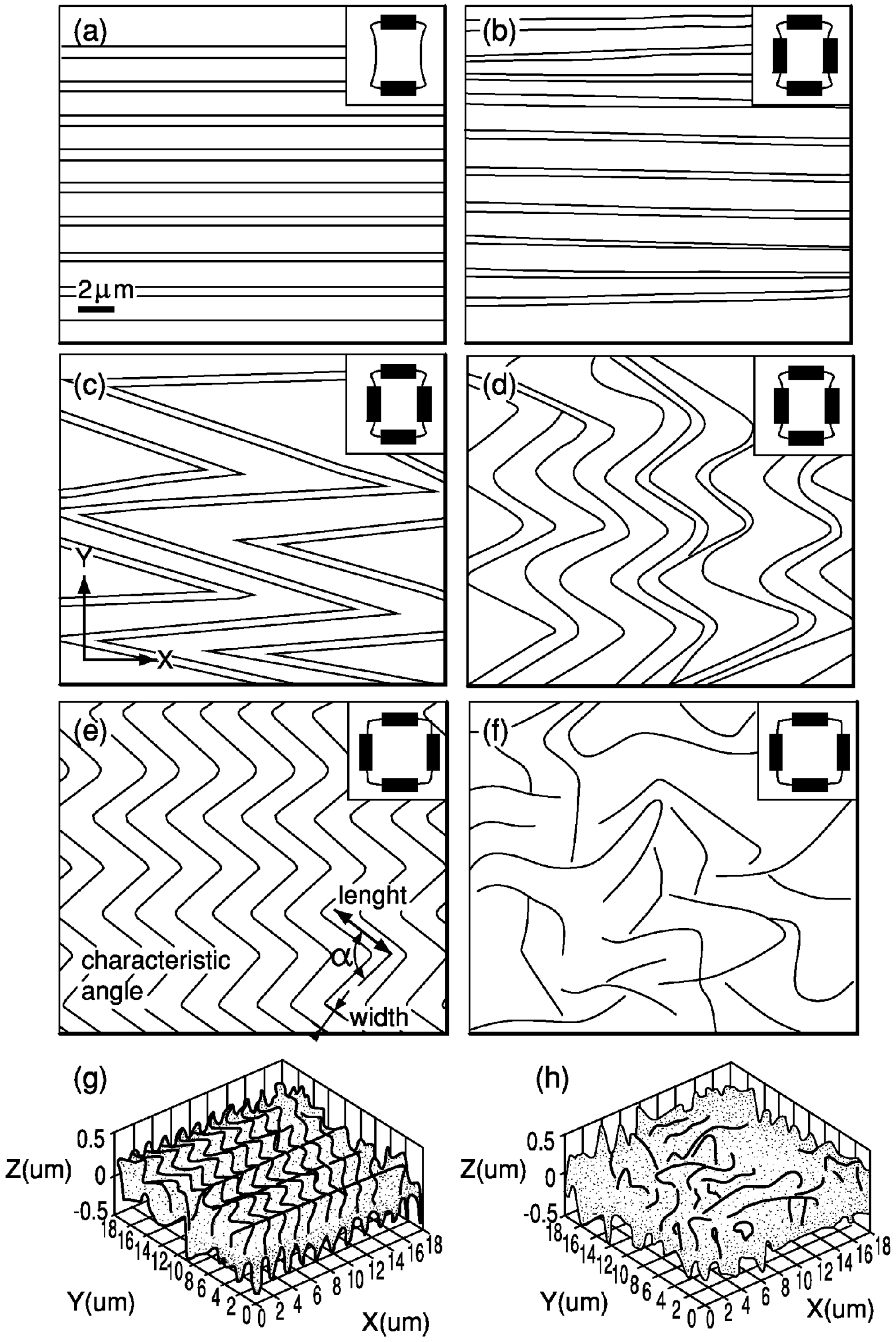
FIG. 7 presents SEM (a-f) and AFM (g-h) images of PDMS samples with different wrinkle patterns (from 1D ripple in transit to 2D herringbone), which were released from different stretch conditions during oxygen plasma treatment. The scale bar in (a) is applicable to (a-f). Insets in (a-f) represent schematic stretch conditions. Equal stretches were applied in Y for all images, while (a) no stretch in X direction, the same as shown in FIG. 6*e*, (b) X=25 mm, stretching back to its original width of the effective area, (c) X=26.25 mm, (d) X=27.5 mm, the same as shown in FIG. 6*f*, (e-f) X=30 mm, where X and Y had the same strain level, the same as shown in FIG. 6*g*. Strains applied and relieved in (b-e) were sequential, i.e., stretching in Y first and X second, while releasing in X first and Y second accordingly, (f) stretching and releasing simultaneously in both directions. (g-h) AFM images corresponding to (e-f).

For a sample stretched in only one direction (Y) (FIG. 6*e*), we observed periodic ripple patterns after release (FIG. 7*a*). It agreed with the qualitative estimation using simplified buckling theories and experimental observation by several groups. This can be explained by considering PDMS film as a large spring, where rest length indicates equilibrium state with minimum energy. During stretching, external energy input is partially transformed into potential spring energy within PDMS. After oxygen plasma treatment, the thin hard oxide layer generated on the surface is in equilibrium state while PDMS is stretched. Once the external mechanical stretch force is released, a new equilibrium state must be relocated due to mismatch of two equilibrium states between the soft PDMS substrate and the hard surface oxidized layer if the substrate spring force exceeds the critical force for buckling the surface thin layer. Due to the larger strain that can be generated during mechanical stretching, the potential spring energy released from PDMS will be used to deform the oxidized layer into higher frequency wrinkle mode with shorter wavelength as well, as to reshape its own surface layer to match the contour of oxidized layer due to strong covalent bonding between them. Because the thin layer and the bulk substrate are from the same material, potential delamination under a large strain can be avoided. However, it also raises the complexity to model such bilayer system because there is no sharp boundary between the oxidized layer from the bulk PDMS to provide exact thickness and modulus of the thin oxide layer.

When the mechanical stretch was subsequently applied to the second direction (X) before oxidization process, the final released wrinkle pattern was found gradually transiting itself from 1D shape into a more complicated 2D pattern when the amount of stretch in the X direction was increased. For example, considering the case of Y=30 mm and X=25 mm (FIG. 1*f*), where X was stretched from 22 mm to 25 mm (the initial shrinkage from X=25 mm to 22 mm after stretch in the Y direction was caused by effect of Poisson ratio), ripple bifurcation occurred occasionally and randomly on the original highly-organized ripple wrinkles shown in FIG. 7*b*. This indicates that, similar to the behavior in the Y direction, rearrangement into a new equilibrium from the mismatched equilibrium states between surface hard layer and bulk soft polymer also occurs in the X direction, which in turn affects the surface buckling orientation. However, at this stage the energy stored/released in the X direction due to stretch was much smaller compared to that in the Y direction, which dominated the final pattern shape. When X was increased to 26.25 mm, the original ripple pattern started to fade out and bifurcated ripples as well as “truncated” bifurcated ripples (zigzag) became the major surface textures (FIG. 7*c*). Once X was increased to 27.5 mm, a more symmetrical zigzag pattern in both X and Y directions, so called herringbone structure, was formed as shown in FIG. 7*d*, opposing to the “Y-squeezed” zigzag shown in FIG. 7*c*. At this point, both regular herringbone patterns as well as randomly dispersed defects were observed all over the samples. When X was further increased to 30 mm reaching the same strain level as in Y, a highly-ordered zigzag-based herringbone pattern, or so called Miura-ori pattern in Japanese traditional Origami art, was formatted. As shown in the SEM (FIG. 7*e*) and AFM images (FIG. 7*g*), the edges of zigzags are parallel to each other and geometrical parameters (lengths, widths and height) of zigzags are uniform with very small deviations. In contrast, a much disordered zigzag-based herringbone pattern was observed (FIGS. 7*f* and 7*h*) if the stretches in both X and Y directions were applied and released simultaneously. The latter is typically observed in heat-induced strain wrinkle patterns, where the strains are inevitably applied and released to sample simultaneously with equal strain level in all three spatial directions, providing the sample itself is thermally isotropic. From the 3D topographical view (FIGS. 7*g* and 7*h*), it is clear that the simultaneously stretched pattern also displays a much larger height irregularity compared to that from sequentially-stretched ones. In this experiment we demonstrate transitions of final patterns from 1D ripples, to ripples with bifurcation, to ripple/herringbone mixed features, and to completely 2D herringbone structures when the pre-strain ratio between two planar axis before oxygen plasma increases gradually from 0 (strain in one direction only) to 1 (strain in both directions with equal amount).

The above study implies that the key to generate highly-ordered zigzag-based herringbone pattern lies in the strategy of sequential stretch/release, specifically the release part. For a sample that is stretched sequentially and equally during oxygen plasma treatment, the first release in the X direction generates highly-ordered 1D ripple patterns, similar to the case where the sample is subjected to the stretch in one direction only followed by release. When the stretch is released in the second Y direction, the sample surface subjected to this new Y-direction buckling force is no longer a 2D flat plane but an array of ripple-shaped columns, which is in principle different from buckling a flat 2D surface in biaxial directions simultaneously. Thus, this orientation-regulating mechanism by generating ripple structure first guarantees the alignment of zigzag pattern directions after the second release.

Figure 8:
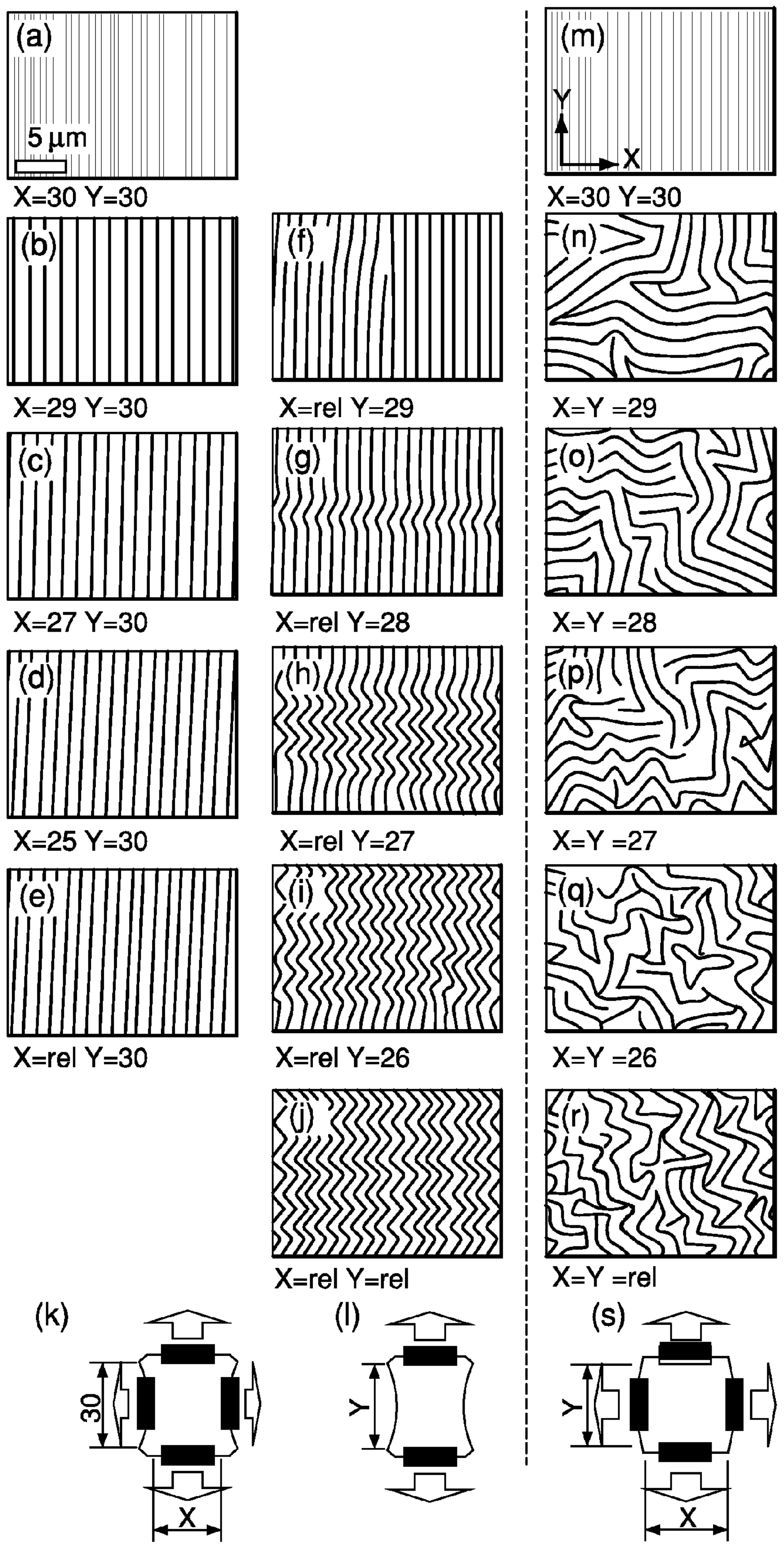
FIG. 8 presents two sets of sequential optical microscope images of two equal-stretched PDMS samples (20% strain) subjected to two different releasing processes, (a-j) and (m-r), respectively, and their corresponding illustrative sketches, (k-1) and (s), accordingly. For the first case (a-j), the sample is stretched sequentially, Y first and X second, before oxygen plasma, the same as shown in FIG. 6*g*, and then release in the sequence of X first (a-e) and Y second (f-j). For the second case (in-r), the sample is stretched and released in both X/Y directions simultaneously. Scale bar in (a) is applicable to all images; "rel" denotes "release", no stretch in that direction.

To confirm this, we performed a series of in situ studies to investigate the pattern formation and transition during sequential and equal stretch/release (FIGS. 8*a-j*). We kept the same stretch conditions of the sample (Y first X second). After oxygen plasma, no pattern was formatted (FIG. 8*a*) since no buckling force existed. During the first release process in the X direction (FIGS. 8*a-e*) while keeping Y unchanged as depicted in FIG. 8*k*, we found ripple pattern was formed immediately once the stress in the sample passed the critical stress for buckling (FIG. 8*b*). The ripple width decreased slightly and gradually while the stretch continued to release (FIGS. 8*c-d*) till the sample was completely restored in the X direction (FIG. 8*e*). When the stretch started to release in the Y direction as well (FIG. 8*l*), we observed ripple bifurcation which was dispersed randomly and irregularly throughout the sample (FIG. 8*f*). The results corresponded well to the pattern shown in FIG. 7*b*, where the sample was subjected to widely unequal stretch between two planar directions during oxygen plasma treatment. When release proceeded further, the zigzag bending started to occur on the original ripple pattern (FIG. 8*g*) and increased (FIGS. 8*h* and 8*i*), which could be interpreted as bending ripple columns to accommodate the new equilibrium status due to biaxial buckling forces. When the stretch was fully released, the 1D ripple columns were completely bent into zigzag shape, forming the highly-ordered herringbone structure (FIG. 8*j*) as the lowest energy state. The result after gradual release agrees well with the SEM and AFM images seen in FIGS. 7*e* and 7*g*, respectively, which show the final patterns after immediate release. During the second release in the Y direction (FIGS. 8*f-j*), the width of ripple remained unchanged, which further supports the concept of bending the ripple columns instead of reformatting the whole pattern to generate the final herringbone structures. The results are in sharp contrast to the observation in the release sequence of a simultaneously stretched/released sample shown in FIGS. 8*m-r*. When the stretches in both X and Y directions started to release, irregular herringbone pattern was formed immediately once the stress in the sample passed the critical stress for buckling (FIG. 8*n*). The width of herringbone continued to decrease with the increase of the wrinkle density while releasing the sample (FIGS. 8*o-q*) till the pre-strain was completely relieved in both directions (FIG. 8*r*). This transition can be reversed when reapplying the stretch to the sample. Thus, we demonstrated performing topographical change in real time from flat, to ripple, gradually to herringbone and vice versa by strain amount applied to the sample.

In both sequential release in the first X direction (FIGS. 8*a-e*) and simultaneous release (FIGS. 8*m-r*) cases, we observed that the wrinkle pattern formed immediately on the originally flat surface once the compression spring force of substrate passed the critical buckling force. Further release did not change the shape of pattern, and most of released strain deformation contributed directly to the increase of wrinkle amplitude as predicted by recent nonlinear theories. For the release in the second Y direction in the sequential release case, it was thought that the strain would not contribute to generate extra amplitudes on the ripples but to release in side directions where the ripple was bent into zigzag patterns with a characteristic angle α defined in FIG. 7*e*. However, instead of forming zigzags all over the ripple columns with a gradually increased from 0 to 90° during release, zigzag herringbones with α~80° were formed on arbitrary locations immediately and propagated cross the whole ripple columns as the release proceeded. We suspect this may be due to (1) residual stress and strain left within ripples, (2) defects or cracks generated during ripple formation, and (3) non-uniform mechanical properties within ripple columns composed by initially-flat but currently-large-deformed oxidized layer and PDMS substrate. In any case, zigzags should be initiated at the weakest section of the column. Similar explanation could be applied to the formation of ripple bifurcation, which was dispersed randomly when the effect of strain in the second directions started to emerge.

For wrinkle formation in the bilayer structures, one widely adopted 1-dimensional analysis shows that initial buckling geometry, which is based on partially-linear partially-nonlinear stability analysis of thin high-modulus layer on a semi-infinite low-modulus substrate, can be described as $$\lambda_0 = \frac{\pi t}{\sqrt{\varepsilon_c}} \qquad (1)$$

$$A_0 = t\sqrt{\frac{\varepsilon_{pre}}{\varepsilon_c} - 1},$$

where $$\varepsilon_c = \frac{1}{4}\left(\frac{3E_s(1-v_t^2)}{E_t(1-v_s^2)}\right)^{\frac{2}{3}}$$

is the critical strain for buckling, and pre E, ν, λ, $A_0$, t, $\epsilon_{pre}$ are Young's modulus, Poisson ratio, ripple wavelength (or width), amplitude, thickness, and pre-strain of the sample, respectively. The subscript s and t denote substrate and thin layer accordingly. However, Equation 1 may not be applicable in our system. First of all, it requires knowledge of the exact Young's modulus and thickness of the oxide layer, which were difficult to measure since oxidization may not be uniform through the film depth but rather a gradient. More importantly, our experiment involves large deformation (up to 60% strain), which falls out of locally linearized domain, thus, the shear force should be taken into account but was ignored in Eq. 1. The linear theory predicts that the wavelength should remain the same during the strain release process, and the amplitude should increase to accommodate the release strain. Instead, we observed gradual decrease of the wavelength during stretch-release process after oxygen plasma (FIG. 9*a*), and the slope and intercept of wavelength-strain curve were dependent on the pre-strains applied to the samples (20, 40 and 60%). The wavelengths were not the same even when they were released to the same strain level. While not wanting to be bound by theory, we believe this can be attributed to the nature of oxidized layer, which is dependent on the pre-strain level in addition to oxygen plasma treatment condition.

Figure 9:
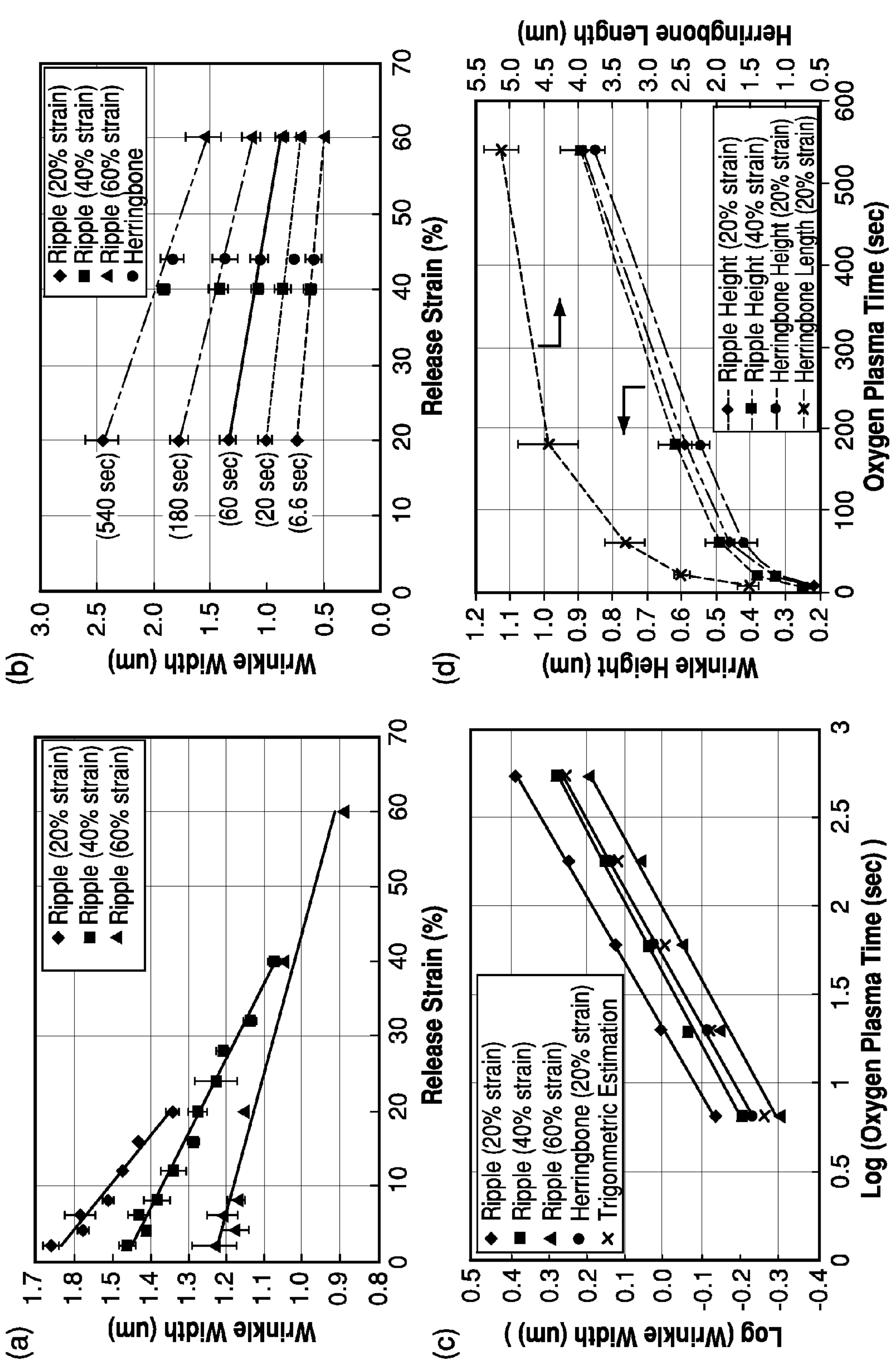
FIG. 9 presents a characterization of ripple and herringbone structures formed under different conditions. The strains listed in the legends indicate the pre-strain amount before oxygen plasma treatment. The straight lines in (a-c) are linear fitting of the data. (a) Change of ripple wavelength during stretch release procedure after oxygen plasma. (b) Final ripple width versus release strain at different oxygen plasma time and stretch amount. (c) Log-Log plot of final ripple and herringbone widths versus oxygen plasma time. (d) Final ripple and herringbone amplitude (left Y axis) and herringbone length (right Y axis) versus oxygen plasma time.

Although Eq. 1 could not quantify the wave properties in our experiments, it does provide a useful guidance of the pattern characteristics. FIG. 9*b* summarizes the ripple wavelength (or width) versus release strain at different oxygen plasma time and pre-strain levels. The ripple wavelength increases as the oxygen plasma time increases, which makes physical sense because the oxide layer becomes harder to bend due to increase of either the Young's modulus or the thickness after longer plasma treatment. The ripple wavelength decreases as the pre-strain level increases, which confirms that a denser packing of wrinkles is needed to accommodate a larger strain. Likewise, herringbone width exhibited monotonic increase versus oxygen plasma treatment time. According to Eq. 1, the initial wrinkle width should be $$\lambda_0 \propto E_r^{1/3} \text{ and } \lambda_0 \propto t \qquad (2).$$

It suggests that we should expect a linear relationship between log $\lambda_0$ and log$E_t$ or logt with a slope of ⅓ or 1, respectively, for a small pre-strain level (<10%), where the initial buckling takes place. Interestingly, when we reprocessed FIG. 9*b* in a log-log plot, we found that the final wrinkle width, at a much larger pre-stain level (20-60%) was linearly proportional to the oxygen plasma time with a slope of 0.25-0.27 (FIG. 9*c*). The positive slope with a value smaller than ⅓ suggests that the relation between Et or t versus oxygen plasma time should be monotonic increase but with power less than 1.

As discussed before, formation of the herringbone pattern should be attributed to gradual buckling of the ripple column during the second release process. Therefore, there must be a simple trigonometric relationship between the ripple width right after the first stretch-release in the X direction and the final herringbone width. Our calculation shows that such relationship does exist (FIG. 9*c*), thus, we can estimate the width of the highly-ordered zigzag-based herringbone pattern based on the characteristics of ripples.

If neglecting directional effect of strain but considering the reduction of total area during stretch release process, the herringbone with the 20% pre-strain in both planar directions is "equivalent" to 44% pre-strain in only one direction. In the plot of ripple width vs. strain (FIG. 9*b*), we see a surprisingly good match if plotting the herringbone width by using this "equivalent" 1D pre-strain, 44%. It is not clear though whether or not there is one characteristic buckling wavelength suitable for 1D, 2D or 3D structures regardless of directional effect (vector) but dependent more on "surface area" effect (scalar). Nevertheless, this method nicely supplements the trigonometric method to estimate the herringbone width.

The other two characteristics of herringbone patterns are length L and characteristic angle α. Unlike the sinusoidal wavy ripple pattern, most of final herringbones formed in our experimental showed a similar sharp turning angle (~80°) regardless of oxygen plasma time. Herringbone length (FIG. 9*d*) also presented a similar monotonic increase trend versus oxygen plasma time.

The second substrate can be composed of any useful material. Illustrative examples include plastics, ceramics, metals, and release tapes. Release tapes have a variety of compositions including polyolefin based tape. Preferably, the second substrate is the same material with wrinkle structures for stronger adhesion.

The preceding experiments show that by using mechanical force to induce large strains (20-60%) on oxygen plasma treated PDMS film, we form various surface wrinkle patterns, including 1D ripple, highly-ordered 2D herringbone structures, and patterns in between during the strain release. This method has the advantages over other reported ones by separately control of the amount and timing of strains on the substrate for both planar directions, which allows us to maneuver the wrinkle pattern shapes in real time. More importantly, for the first time we demonstrate the wrinkle transition from ripple, to ripple with bifurcation, to ripple/herringbone mixture, and to completely herringbone structure. We discover that when equal but sequential strains are applied to the oxide-on-PDMS layer, followed by sequential release in the reverse order, highly-ordered zigzag wrinkles can be formed, which is in sharp contrast to random herringbone structures generated by equally and simultaneously applied strain induced by heat or mechanical force. To elucidate the mechanisms of pattern formation under large strain levels and the transition between patterns, we study the variables such as widths, heights, and other characteristics of wrinkles between ripple and herringbone structures. While not wanting to be bound by theory, we believe such mechanistic study may offer important insights to manipulate self-organization of polymer thin films for more complex micro-structures. In addition, formation of the highly-ordered zigzag-based herringbone pattern as well as other transition patterns in the submicron scales may provide new and useful applications in MEMS, plastic electronics, nano- and microfluidics, and sensors and actuators.

Figure 10:
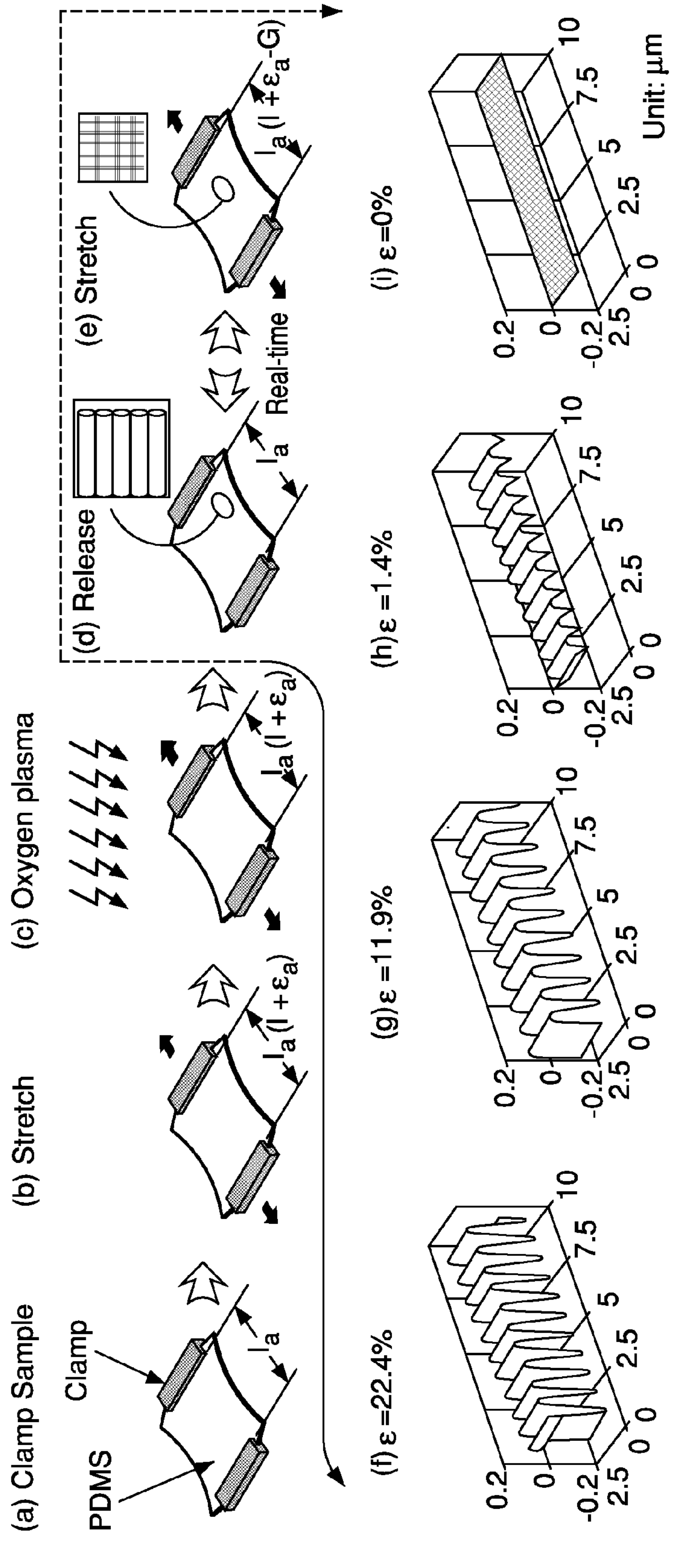
FIG. 10 presents a schematic illustration of the fabrication of rippled PDMS film (a-e) and real-time, reversible tunability of surface topography by mechanical strain (f-i). (a) Clamp PDMS film. (b) Stretch PDMS film to a designated strain value. (c) Oxygen plasma treatment. (d) Release stretch of the PDMS/oxide bilayer and spontaneous formation of ripple patterns. (e) Stretch back to the initial strain value and the ripple patterns disappear. (f-i) 3D surface contour of rippled surfaces measured by AFM and plotted using Matlab®.

In further experiments, a PDMS strip (40 mm×15 mm) with a rippled surface was fabricated following a procedure described above. First, the PDMS strip was clamped (FIG. 10_a_) and mechanically stretched to an initial strain ($\epsilon_0$) of 22.4% (FIG. 10_b_) in one direction. It was then subjected to oxygen plasma treatment in the stretched state (FIG. 10_c_) to generate a stiff and thin oxidized silicaceous layer on its top surface. By partially releasing the initial strain ($\epsilon_0$) to a critical level, an ordered periodic one dimensional ripple pattern was formed spontaneously (FIG. 10_d_). Releasing the initial strain beyond the critical level increases the amplitude of these ripples (FIG. 10_f_-10_h_). If the sample is stretched back to $\epsilon_0$, the surface returns to a flat state (FIG. 10_e_-10_i_). This allows one to control the adhesion in real-time via adjustment of the rippled surface by mechanical strain (FIG. 10_d_-10_e_), nor the quantitative understanding of changes in the adhesion in response to the strain.

Low roughness or deep indentation, the pull-off force $F_{ad}$ is estimated using Johnson-Kendall-Roberts (JKR) theory, that is, $$F_{ad} = \frac{3}{2} W_{eff} \pi R \tag{3}$$

where R is the radius of the indenter and $W_{eff}$ is the effective work of adhesion. It should be noted that in JKR theory the contacting surfaces are assumed to be smooth and the contact to be circular. We have observed experimentally that the contact remains approximately circular despite the anisotropy introduced in the surface by the ripples. On retraction of the indenter, energy is released from the bulk. In our case, additional energy may be recovered by the system because the surface is rippled.

A measure of adhesion can be obtained from experiments in which a glass sphere is indented the sample surface to a depth, Δ, (10 μm, for example) and is then retracted. The PDMS strip is mounted on the inverted optical microscope stage for indentation to measure the adhesive force at different strain levels. The motion of the stage is controlled by a motorized linear stage. The sphere is retracted and the maximum force supported by the indenter, the pull-off force, $F_{ad}$, is used as a measure of adhesion. A series of force-displacement data can be obtained from a series of experiments on a single sample at different values of strain ($\epsilon$). Our measure of strain is defined as the following: if $I_0$ is the initial undeformed length of the PDMS substrate, $\epsilon$ is the released strain relative to the initial stretched state so that the deformed length of the specimen, $1=I_0(1+\epsilon_0-\epsilon)$. Adhesion reduces systematically and significantly with the increase of $\epsilon$, which is accompanied by an increase of ripple amplitude. These results suggest that strain offers an effective means for direct control of adhesion. Indeed, we can repeat the stretch-release cycle many times while maintaining these tunable adhesion characteristics.

Figure 11:
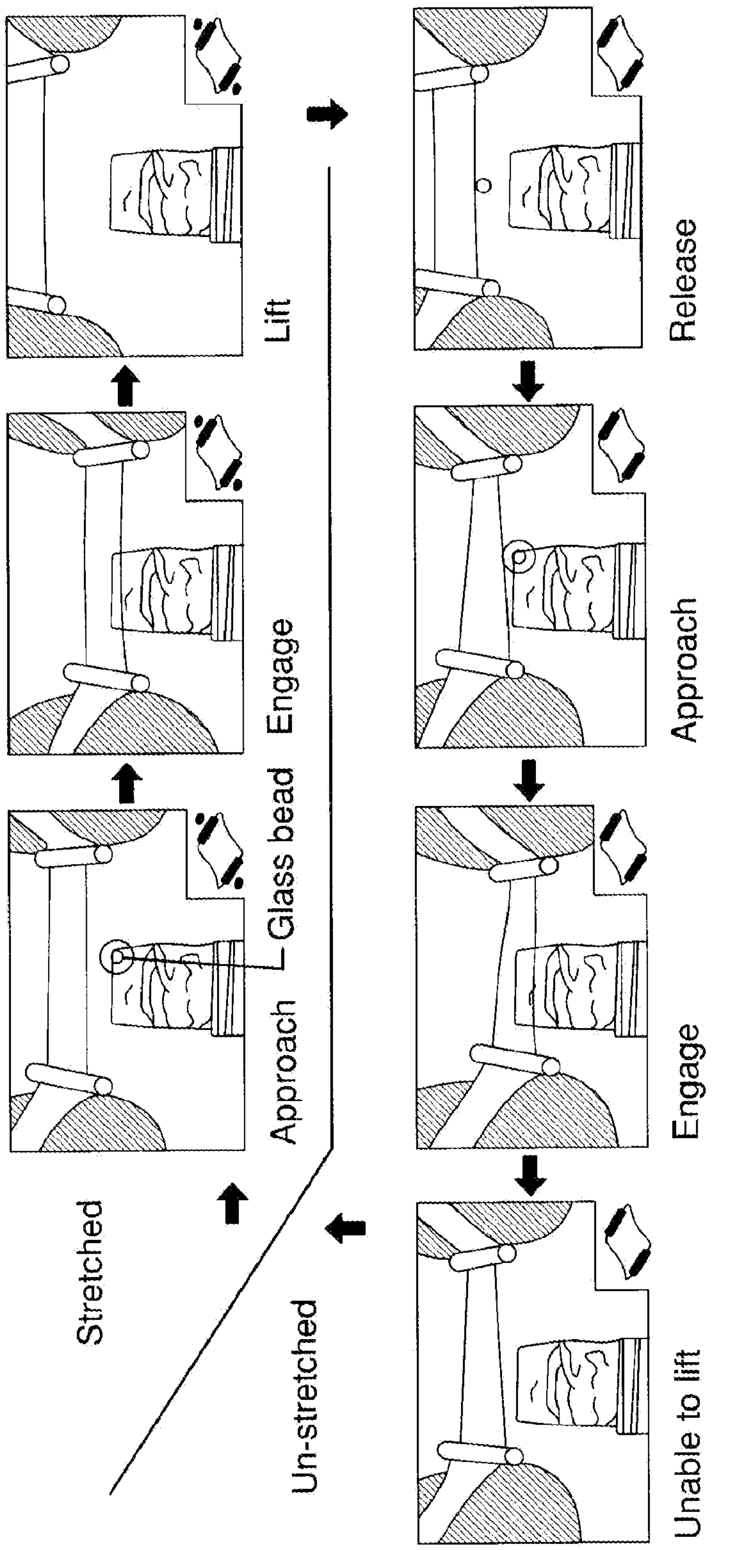
FIG. 11 presents images of picking and release of a small glass sphere using the rippled PDMS film, demonstrating real-time tunable dry adhesion. A glass ball can be lifted up (a-c) when the rippled PDMS film is stretched flat (high adhesion), and dropped (d) as the stretch is released (reduced adhesion). When the sample is unstretched (rippled surface, low adhesion), the adhesion force is too low to lift the glass ball (e-g). Insets show schematic drawings of the status of strain on the PDMS film.

To illustrate the feasibility of real-time tunability of the new adhesive, we have performed a "pick and release" experiment using the rippled PDMS film. FIG. 11 shows a series of movie frames from this demonstration. When the rippled PDMS film is fully stretched, the pull-off force is estimated as 2.14 mN using Eq. (3) and $W_{ad}$=381 mN/m, exceeding the weight of a 3⁄32"-diameter glass ball, 1.33 mN. Thus, the adhesion force is sufficient to lift the ball as shown in FIGS. 11_a-c_. Upon strain release, when the roughness of PDMS strip is increased to a critical value, the glass ball drops due to loss of adhesion (FIG. 11_d_). Then the glass ball cannot be picked up in this configuration of PDMS further proves the loss of adhesion (FIGS. 11_e-g_). The "pick and release" process can be controlled reversibly and repeatably.

Experimental

Sample preparation PDMS precursor (RTV615 from GE Silicones) was mixed with curing agent (10:1) and sandwiched between two 12"×3" borosilicate flat-plate glasses using 0.5 mm-height shims as spacers. The glasses were held together by 10 large 2" binder clips and cured at 65° C. for 4 hours in a forced-air convection oven. After curing, the PDMS sheet with thickness 0.5±0.02 mm was cut into small squares (30 mm×30 mm or 40 mm×15 mm).

For stretch-release experiments, the PDMS square was clamped by four small binder clips on all four edges of samples at the same time to prevent unnecessary strain constraint and interference between two stretch directions. The positions of these four binder clips are controlled by a custom-made jig composed of one large acrylic base and four sliders whose positions could be adjusted continuously in real-time by four long-thread M4 wing screws. PDMS samples with designated stretch conditions as shown in FIGS. 6_b_ and 6_e_-6_g_ were placed inside an oxygen plasma reactive ion etcher (Technics PE11-A) at 100 watts for 60 second, and pressure of 550 mtorr (FIG. 6_c_). Afterwards, the stretched samples were released in a reverse order opposed to that of stretch to avoid sample warping (FIG. 6_d_). A set of samples with simultaneous stretches to 30 mm in both X/Y directions were also prepared for comparison. To study the tunable range of wavelength of wrinkle pattern and fundamental mechanism of pattern transition, we varied the oxygen plasma time for 6.6, 20, 60, 180, and 540 s, respectively, and stretched samples at 20%, 40%, and 60% pre-strain, respectively. For 40% and 60% stretches, samples with dimension 30 mm×5 mm were used to reduce required stretch force.

Characterization: Scanning electron microscopy (SEM) images were taken on FEI Strata DB235 Focused Ion Beam at 5 KeV. Surface topography was imaged by DI Dimension 3000 Atomic Force Microscopy (AFM) in tapping mode, and the raw image data were imported into Matlab® to better illustrate the 3D surface. The adhesion force measurement setup is custom designed, consisting of inverted microscope (Olympus PMG3), miniature linear stage (Newport MFA-CC), load cell (transducer techniques, GSO-10), and a 8 mm-diameter glass indenter. In the indentation tests, the sample with controlled strain (ϵ) was fixed on top of the microscope stage, while the glass indenter was moved up-and-down at a speed of 1 μm/s and depth of 10 μm for each indentation cycle. The motion was controlled by a linear motorized stage and the force was collected through load cell located between the indenter and the motor. Force data and linear stage position were collected by NI LabView 8.0 program. Demonstration of "pick and release" was captured on video by a SONY HDR-HC 1 HD video camera and edited by Mac iMovie.

What is claimed:

1. A method comprising:

mechanically applying strain to a substrate in a preselected direction and amount;

applying a coating layer on the strained substrate, said coating layer having a higher Young's Modulus than the substrate;

releasing the strain to form a first rippled surface structure and reapplying strain to the substrate in a predetermined amount;

contacting the coating layer with a second substrate; and releasing said strain to provide the coating layer with a predetermined second rippled surface structure.

2. The method of claim 1 comprising a metal or silicone oxide coating.

3. The method of claim, 1 wherein the substrate is poly (dimethylsiloxane).

4. The method of claim 3, wherein the coating layer is applied by oxidizing the surface of the poly(dimethylsiloxane).

5. The method of claim 4, wherein the oxidizing is accomplished by exposing the surface to ultraviolet light and oxygen.

6. The method of claim 5, where in the exposing of the surface comprises oxygen plasma treatment.

7. The method of claim 1, wherein said strain is applied in two directions.

8. The method of claim 7, wherein the two directions are offset by approximately 90 degrees.

9. The method of claim 7, wherein the strain is substantially simultaneously applied in the two directions.

10. The method of claim 7, wherein the strain is sequentially applied in the two directions.

11. The method of claim 7, wherein after releasing the strain, the substrate has a two dimensional ripple structure.

12. The method of claim 7, wherein the strain in each of the two directions is substantially equal.

13. The method of claim 7, wherein the strain is released sequentially in the two directions.

14. The method of claim 7, wherein the strain is released substantially simultaneously in the two directions.

15. The method of claim 1, wherein after releasing the strain, the substrate has a one dimensional ripple structure.

16. The method of claim 1, wherein the strain level is greater than 1%.

17. The method of claim 1, wherein the strain level is greater than 10%.

18. The method of claim 1, wherein the strain level is about 20 to about 60%.

19. The method of claim 1, wherein the strain level is about 20 to about 40%.

20. The method of claim 1, wherein the second substrate is plastic, ceramic, metal, or a release tape.

21. A method comprising:

providing a first substrate;

mechanically applying strain to the first substrate in at least one direction;

applying a first coating layer on the first substrate, said coating layer having a higher Young's Modulus than the first substrate;

releasing the strain to form a first rippled surface structure and reapplying strain to the substrate in a predetermined amount;

coating the first coating layer with a second coating layer;

contacting the second coating layer with a second substrate; and releasing said strain to produce a predetermined second rippled surface structure on in the first and second coating layers.

22. The method of claim 21, wherein the second coating layer comprises an adhesive.

23. The method of claim 22, wherein the adhesive is an acrylates or methacrylate adhesive.

24. The method of claim 22, wherein the substrate is poly (dimethylsiloxane the coating layer is applied by oxidizing the surface of the poly(dimethylsiloxane).

25. The method of claim 24, wherein the oxidizing is accomplished by exposing the surface to ultraviolet light and oxygen.

26. The method of claim 21, wherein said strain is applied in two directions.

27. A method for providing a tunable adhesive comprising:

mechanically applying strain to a substrate in one or more different directions and in independently preselected magnitudes;

applying a coating layer on the strained substrate, said coating layer having a higher Young's Modulus than the substrate;

releasing the strain to form a first rippled surface structure and reapplying strain to the substrate in a predetermined amount and releasing at least a portion of said strain in at least one direction to provide the coating layer with predetermined second rippled surface structure to produce a tunable adhesive.

28. The method of claim, 27 wherein the substrate is poly (dimethylsiloxane).

29. The method of claim 28, wherein the coating layer is applied by oxidizing the surface of the poly(dimethylsiloxane).

30. The method of claim 27, wherein the strain is applied in two different directions.

31. The method of claim 30, wherein the two strains are applied in directions that are about perpendicular to each other.

* * * * *

UNITED STATES PATENT AND TRADEMARK OFFICE

CERTIFICATE OF CORRECTION

PATENT NO. : 8,372,230 B2
APPLICATION NO. : 12/593756
DATED : February 12, 2013
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this
First Day of September, 2015

Michelle K. Lee
*Director of the United States Patent and Trademark Office*